(12) United States Patent
Ozawa

(10) Patent No.: US 7,723,963 B2
(45) Date of Patent: May 25, 2010

(54) TARGET REGULATION VOLTAGE SETTING APPARATUS

(75) Inventor: Jyun Ozawa, Chiryu (JP)

(73) Assignee: Denso Corporation, Kariya (JP)

( * ) Notice: Subject to any disclaimer, the term of this patent is extended or adjusted under 35 U.S.C. 154(b) by 10 days.

(21) Appl. No.: 12/292,385

(22) Filed: Nov. 18, 2008

(65) Prior Publication Data

US 2009/0134847 A1    May 28, 2009

(30) Foreign Application Priority Data

Nov. 28, 2007    (JP)    ............................. 2007-307093

(51) Int. Cl.
*H02P 9/00*    (2006.01)
(52) U.S. Cl. .................... 322/28; 322/16; 290/40 D; 361/123; 180/65.1
(58) Field of Classification Search .............. 322/28; 361/123; 290/40 D; 180/65.1
See application file for complete search history.

(56) References Cited

U.S. PATENT DOCUMENTS

| | | | |
|---|---|---|---|
| 6,037,728 A * | 3/2000 | Petkovic | ..................... 318/364 |
| 6,625,528 B2 | 9/2003 | Kobayashi | |
| 7,468,562 B1 * | 12/2008 | Barbic | ....................... 290/40 C |
| 7,521,814 B2 * | 4/2009 | Nasr | ........................ 290/40 C |
| 7,560,882 B2 * | 7/2009 | Clark et al. | ................. 318/139 |

FOREIGN PATENT DOCUMENTS

| JP | A-11-252997 | 9/1999 |
|---|---|---|
| JP | A-2003-061400 | 2/2003 |

\* cited by examiner

*Primary Examiner*—T C Patel
*Assistant Examiner*—Iraj A Mohandesi
(74) *Attorney, Agent, or Firm*—Oliff & Berridge, PLC

(57) ABSTRACT

The target regulation voltage setting apparatus for a vehicle on which a vehicle alternator is mounted includes a first function of calculating a large first-order delay and a small first-order delay of a rotational speed of the vehicle alternator at regular time intervals, a second function of making a judgment on a running state of the vehicle by determining whether or not the vehicle is in one of an accelerating state and a decelerating state on the basis of a variation of the large first-order delay supplied from the first function, and determining whether or not the vehicle is in a normal state on the basis of a variation of the small first-order delay supplied from the first function, and a third function of determining a target regulation voltage of the vehicle alternator in accordance with a judgment result of the second function.

7 Claims, 8 Drawing Sheets

FIG. 3
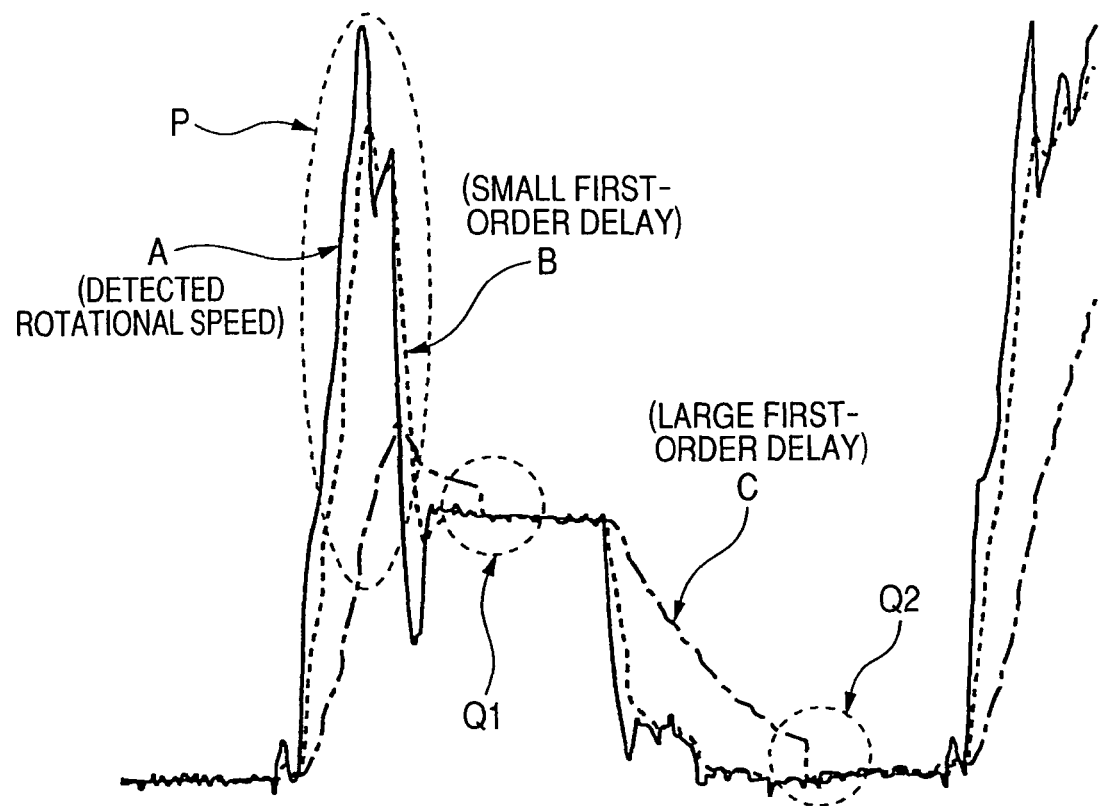
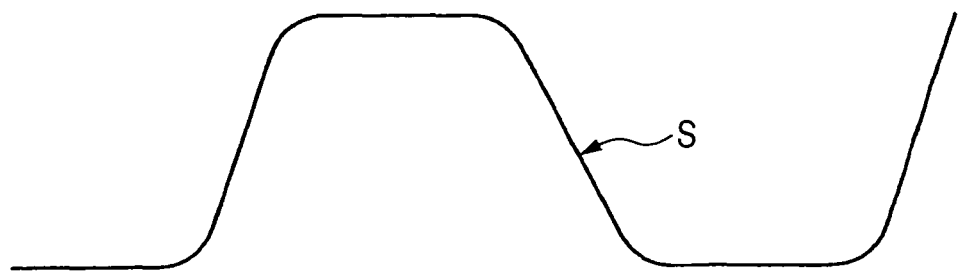

FIG. 5

| RUNNING STATE | FIRST-ORDER DELAY TO BE USED | DETERMINING CRITERIA | TARGET REGULATION VOLTAGE |
|---|---|---|---|
| IDLE STATE | SMALL FIRST-ORDER DELAY | ENTERING FROM RANGE BELOW 550 TO RANGE BETWEEN 550 AND 600 | 12.5V |
| ACCELERATING STATE | Δ LARGE FIRST-ORDER DELAY | ENTERING FROM RANGE OVER 30 TO RANGE BETWEEN 5 AND 30 | 13.5V |
| DECELERATING STATE | Δ LARGE FIRST-ORDER DELAY | ENTERING FROM RANGE BELOW -30 TO RANGE BETWEEN -30 AND -10 | 14.5V |
| NORMAL STATE | Δ SMALL FIRST-ORDER DELAY | IN RANGE BETWEEN -30 AND 30 | 13.5V |
| | ANY CASE OTHER THAN THE ABOVE CASES | | |

FIG. 6
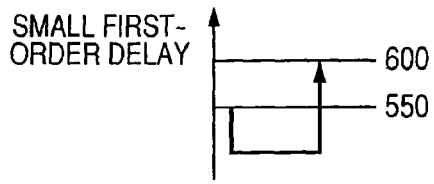

FIG. 7A
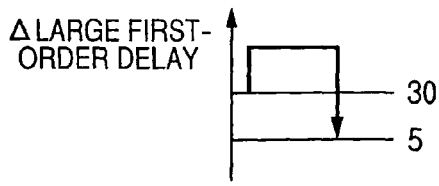

FIG. 7B
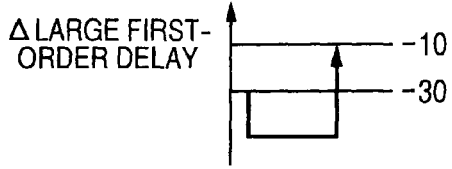

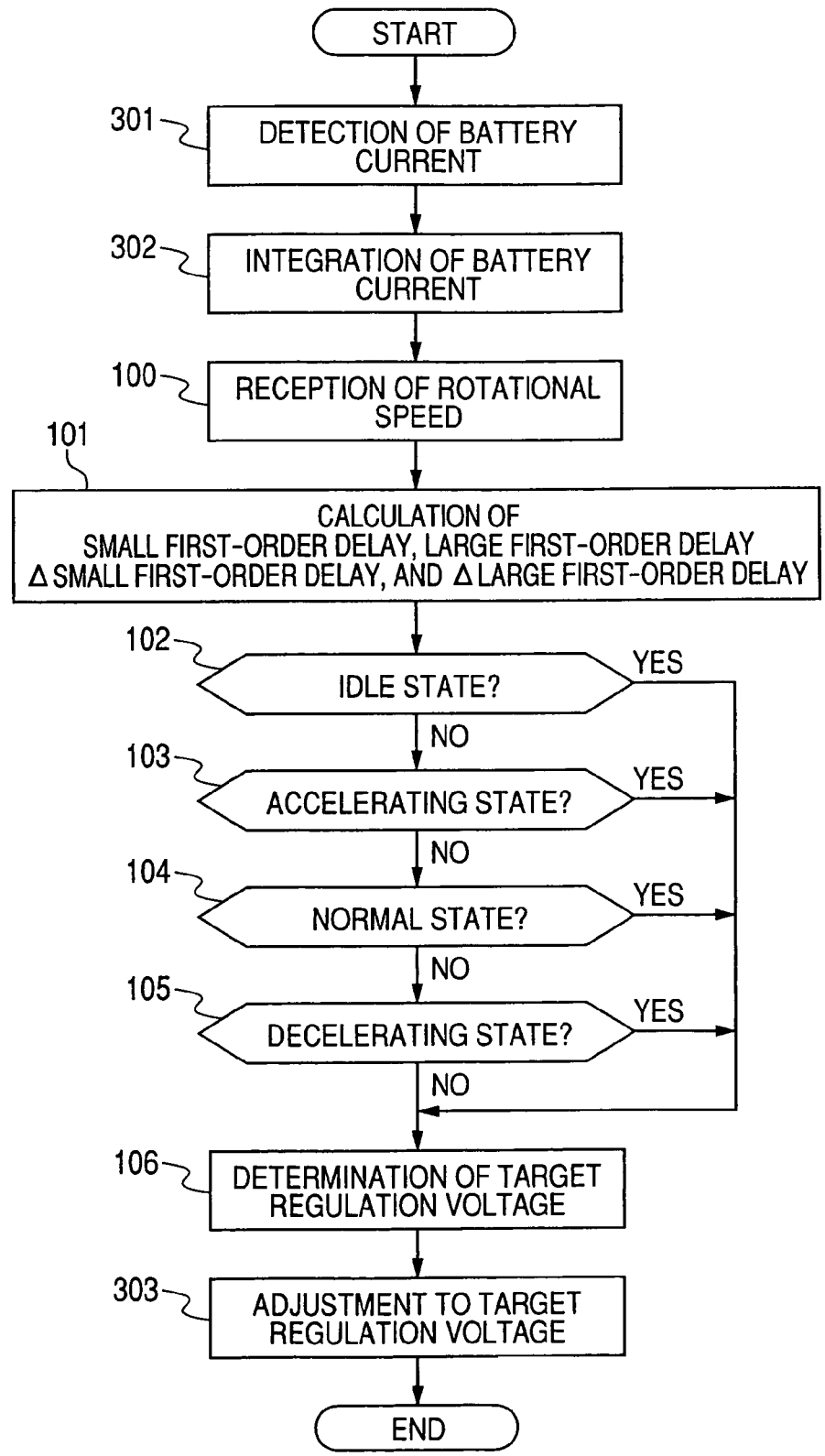

TARGET REGULATION VOLTAGE SETTING APPARATUS

CROSS-REFERENCE TO RELATED APPLICATION

This application is related to Japanese Patent Application No. 2007-307093 filed on Nov. 28, 2007, the contents of which are hereby incorporated by reference.

BACKGROUND OF THE INVENTION

1. Field of the Invention

The present invention relates to an apparatus for setting a target regulation voltage of a vehicle alternator mounted on a vehicle such as a passenger car or a truck.

2. Description of Related Art

There is known a voltage control apparatus for a vehicle alternator, which is configured to detect a rotational speed of the vehicle alternator, calculates a first-order delay of the rotational speed of the vehicle alternator, determines a running state of the vehicle on the basis of difference between the detected rotational speed and the calculated first-order delay, and changes a target regulation voltage of the vehicle alternator depending on the determined running state of the vehicle. For example, refer to Japanese Patent Application Laid-open No. 11-252997. According to such a voltage control apparatus, it is possible to control a vehicle alternator while detecting the running state of a vehicle without provision of specific terminals and cables for connection with external devices, which may cause malfunction of the voltage control apparatus due to poor connection with the external devices.

However, the voltage control apparatus described in the above Patent Document may make an erroneous determination on the running state of the vehicle depending on variation of the rotational speed of the vehicle alternator when a shift change is performed. That is because, since a change in gear ratio is caused by the shift change, increase (or decrease) of the rotational speed of the vehicle alternator does not necessarily mean that the vehicle is in the accelerating state (or in the decelerating state). Furthermore, since the running state of the vehicle is determined from the difference between the detected rotational speed of the vehicle alternator and its first-order delay, the timing at which the running state of the vehicle is determined to have changed may be too late when the vehicle changes from the accelerating state (or decelerating state) to the normal speed (constant-speed state). If such an erroneous determination or late determination is made, fuel consumption is increased, because it is not possible to set the target regulation voltage to an optimum value depending on the running state of the vehicle. In addition, since the voltage control apparatus is located near the vehicle alternator, and accordingly it is susceptible to heat or magnetism from the vehicle alternator, accuracy of setting the target regulation voltage may be lowered.

SUMMARY OF THE INVENTION

The present invention provides a target regulation voltage setting apparatus for a vehicle on which a vehicle alternator is mounted comprising:

a first function of calculating a large first-order delay and a small first-order delay of a rotational speed of the vehicle alternator at regular time intervals;

a second function of making a judgment on a running state of the vehicle by determining whether or not the vehicle is in one of an accelerating state and a decelerating state on the basis of a variation of the large first-order delay supplied from the first function, and determining whether or not the vehicle is in a normal state on the basis of a variation of the small first-order delay supplied from the first function; and a third function of determining a target regulation voltage of the vehicle alternator in accordance with a judgment result of the second function.

According to the present invention, there is provided a target regulation voltage setting apparatus with provision for preventing an erroneous determination or a late determination on the running state of a vehicle from being made, to thereby improve fuel consumption.

Other advantages and features of the invention will become apparent from the following description including the drawings and claims.

BRIEF DESCRIPTION OF THE DRAWINGS

In the accompanying drawings:

FIG. 3 is a diagram showing an example of a relationship between a speed of a vehicle and a first-order delay of the rotational speed of the vehicle alternator calculated by the target regulation voltage setting apparatus;

FIG. 5 is a table to determine the running state of the vehicle and to set the target regulation voltage of the vehicle alternator;

FIG. 6 is a diagram showing an example of variation with time of a small first-order delay of the rotational speed of the vehicle alternator calculated by the target regulation voltage setting apparatus, which satisfies the criteria to determine that the vehicle has entered the idle state;

FIG. 7A is a diagram showing an example of variation with time of a large first-order delay of the rotational speed of the vehicle alternator calculated by the target regulation voltage setting apparatus, which satisfies the criteria to determine that the vehicle has entered the accelerating state;

FIG. 7B is a diagram showing an example of variation with time of the large first-order delay, which satisfies the criteria to determine that the vehicle has entered the decelerating state;

FIG. 11 is a flowchart showing the operation of the target regulation voltage setting apparatus at the time of adjusting the target regulation voltage n accordance with the integrated charge/discharge current of the battery.

PREFERRED EMBODIMENTS OF THE INVENTION

Figure 1:
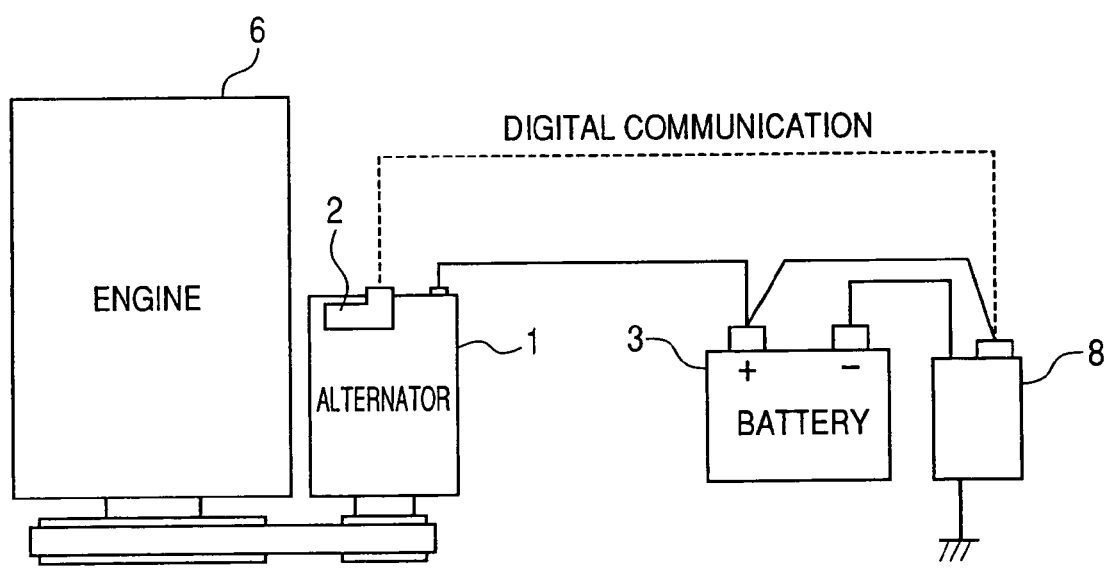
FIG. 1 is a diagram showing an overall structure of a vehicle-mounted charging system including a target regulation voltage setting apparatus according to an embodiment of the invention.

FIG. 1 is a diagram showing an overall structure of a vehicle-mounted charging system including a target regulation voltage setting apparatus 8 according to an embodiment of the invention. As shown in FIG. 1, this charging system includes a vehicle alternator 1, a battery 3, a vehicle engine 6, and the target regulation voltage setting apparatus 8.

Figure 2:
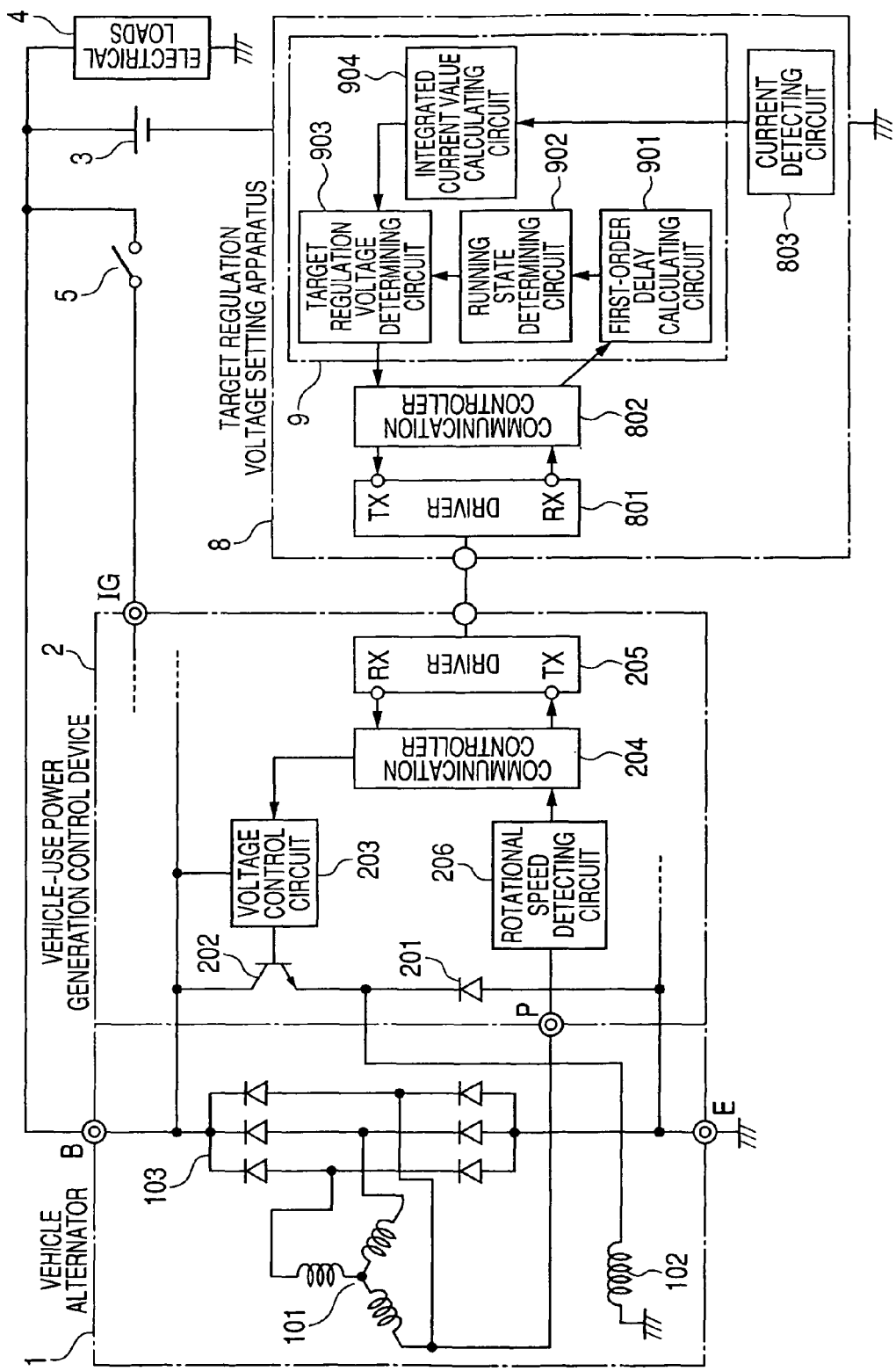
FIG. 2 is a diagram showing detailed structures of the target regulation voltage setting apparatus, a vehicle-use power generation control device, and a vehicle alternator 1 included in the vehicle-mounted charging system shown in FIG. 1.

The vehicle alternator 1 is belt-driven by the vehicle engine 6 to generate electric power to be supplied to the battery 3 and various electrical loads 4 (see FIG. 2). The vehicle alternator 1 includes therein a vehicle-use power generation control device 2. The target regulation voltage setting apparatus 8, which is located near the battery 3, detects a charge/discharge current (battery current) of the battery 3, and sets a target regulation voltage of the vehicle alternator 1. The target regulation voltage setting apparatus 8 may be mounted to the terminals or case of the battery 3.

FIG. 2 is a diagram showing the detailed electrical structures of the target regulation voltage setting apparatus 8, vehicle-use power generation control device 2, and vehicle alternator 1. As shown in FIG. 2, the vehicle alternator 1 includes a stator around which a three-phase stator winding 101 is wound, a rotor around which an excitation winding 102 is wound, and a rectifier circuit 103 for full-wave rectifying the three-phase output of the stator winding 101. To keep the output voltage of the vehicle alternator 1 at the target regulation voltage, the vehicle-use power generation control device 2 intermittently allows an excitation current to pass to the excitation winding 102.

The vehicle-use power generation control device 2 includes a flywheel diode 201, a switching element 202, a voltage control circuit 203, a communication controller 204, a driver 205, and a rotational speed detecting circuit 206. The switching element 202 is series-connected to the excitation winding 102. When the switching element 202 is turned on, the excitation current is passed to the excitation winding 102. The flywheel diode 201, which is parallel-connected to the excitation winding 102, allows a surge current caused when the switching element 202 is turned off to pass therethrough.

The voltage control circuit 203 controls the on/off state of the switching element 202 such that the output voltage of the vehicle alternator 1 (or the terminal voltage of the battery 3) is kept at the target regulation voltage designated by a target regulation voltage signal inputted through the communication controller 204. The rotational speed detecting circuit 206 monitors the phase voltage across one of the three phase coils of the stator winding 101 in order to detect the rotational speed of the vehicle alternator 1.

The communication controller 204 performs communication control on various signals transmitted to and received from the target regulation voltage setting apparatus 8 through a communication line. In more detail, the communication controller 204 transforms a rotational speed signal indicative of the rotational speed of the vehicle alternator 1 transmitted from the rotational speed detecting circuit 206 into digital data of a predetermined format as a digital modulated signal. This digital modulated signal is transmitted from the driver 205 to the target regulation voltage setting apparatus 8 through the communication line. The driver 205 has also a receiver function of receiving a digital modulated signal (the target regulation voltage signal) transmitted from the target regulation voltage setting apparatus 8. The communication controller 204 has also a function of demodulating the digital modulated signal received at the driver 205 to reproduce the target regulation voltage signal. This reproduced target regulation voltage signal is inputted into the voltage control circuit 203.

As shown in FIG. 2, the target regulation voltage setting apparatus 8 includes a driver 801, a communication controller 802, a current detecting circuit 803, and a microcomputer 9. The current detecting circuit 803 is for detecting the charge/discharge current of the battery 3. The current detecting circuit 803 may be configured to detect the charge/discharge current of the battery 3 on the basis of a voltage across a shunt resistor (not shown) connected between the negative terminal of the battery 3 and the ground.

The microcomputer 9, which is for setting the target regulation voltage of the vehicle alternator 1, includes a first-order delay calculating circuit 901, a running-state determining circuit 902, a target regulation voltage determining circuit 903, and an integrated current value calculating circuit 904. The first-order delay calculating circuit 901 calculates the first-order delay of the rotational speed of the vehicle alternator 1 in accordance with the following equation.

(the first-order delay)=$((M-1)/M)\times$(the previously calculated first-order delay)+$(1/M)\times$(the currently detected rotational speed)     (1)

In this embodiment, M (which is a dulling factor or smoothing factor) is set to 16 to calculate the first-order delay of a large value (referred to as the "large first-order delay" hereinafter), and set to 4 to calculate the first-order delay of a small value (referred to as the "small first-order delay" hereinafter). Calculating the first-order delay with the smoothing factor M is equivalent to averaging the values of the rotational speed detected M times consecutively. Accordingly, the first-order delay may be calculated by storing the values of the rotational speed detected M times consecutively, and moving-averaging these stored values, instead of using the equation (1). It is preferable that the value of M is $2^n$, n being a natural number.

The running-state determining circuit 902 determines whether the vehicle is in the accelerating state or decelerating state on the basis of the variation of the large first-order delay, and determines whether or not the vehicle is in the idle state on the basis of the variation of the small first-order delay. In more detail, the variation of the first-order delay is calculated in accordance with the following equation.

(the variation of the first-order delay)=(the current value of the first-order delay)−(the previous value of the first-order delay)     (2)

The integrated current value calculating circuit 904 integrates the charge/discharge current of the battery 3 detected by the current detecting circuit 803. The target regulation voltage determining circuit 903 determines the target regulation voltage of the vehicle alternator 1 on the basis of the determination result of the running-state determining circuit 902 and the integrated value of the charge/discharge current calculated by the integrated current value calculating circuit 904.

The driver 801 and the communication controller 802, which are provided for signal transmission and reception with the vehicle-use power generation control device 2, operate in basically the same way as the driver 205 and the communication controller 204 of the vehicle-use power generation control device 2. When the driver 801 receives the digital modulated signal transmitted from the vehicle-use power generation control device 2 through the communication line, the communication controller 802 demodulates this digital modulated signal, and the resultant reproduced data indicative of the rotational speed of the vehicle alternator 1 is inputted into the first-order delay calculating circuit 901 of the microcomputer 9. Upon receiving a signal indicative of the target regulation voltage determined by the target regulation voltage determining circuit 903 included in the microcomputer 9, the communication controller 802 transforms this signal into digital data of a predetermined format as a digital modulated signal. This digital modulated signal is transmitted from the driver 801 to the vehicle-use power generation control device 2 through the communication line.

Next, the operation of the vehicle-mounted charging system having the above described structure is explained. FIG. 3 is a diagram showing an example of a relationship between the vehicle speed and the first-order delay. In FIG. 3, S denotes the vehicle speed, A denotes the small first-order delay (M=4), and C denotes the large first-order delay (M=16).

In the example shown in FIG. 3, when a shift change is performed (the portion circled by the dotted line in FIG. 3), it is possible to correctly determine that the vehicle is in the accelerating state or decelerating on the basis of the large first-order delay. However, when the vehicle shifts from the accelerating state to the normal state (constant-speed state), since it takes some time for the value of the large first-order delay to become stable, the timing at which the vehicle is determined to have shifted from the accelerating or decelerating state to the normal state is delayed. Particularly, in order to perform regenerative braking by use of the vehicle alternator 1 to thereby improve fuel consumption, it is required to accurately detect a shift timing from the accelerating or decelerating state to the normal state. Accordingly, in this embodiment, the shift timing is detected on the basis of the small first-order delay. Incidentally, the portions shown by Q1 and Q2 of FIG. 3 correspond to a later-described modification of this embodiment in which the large first-order delay is replaced by the small first-order delay when the normal state lasts longer than a predetermined time period. If such a replacement is not performed, the large first-order delay gradually approaches the small first-order delay.

Figure 4:
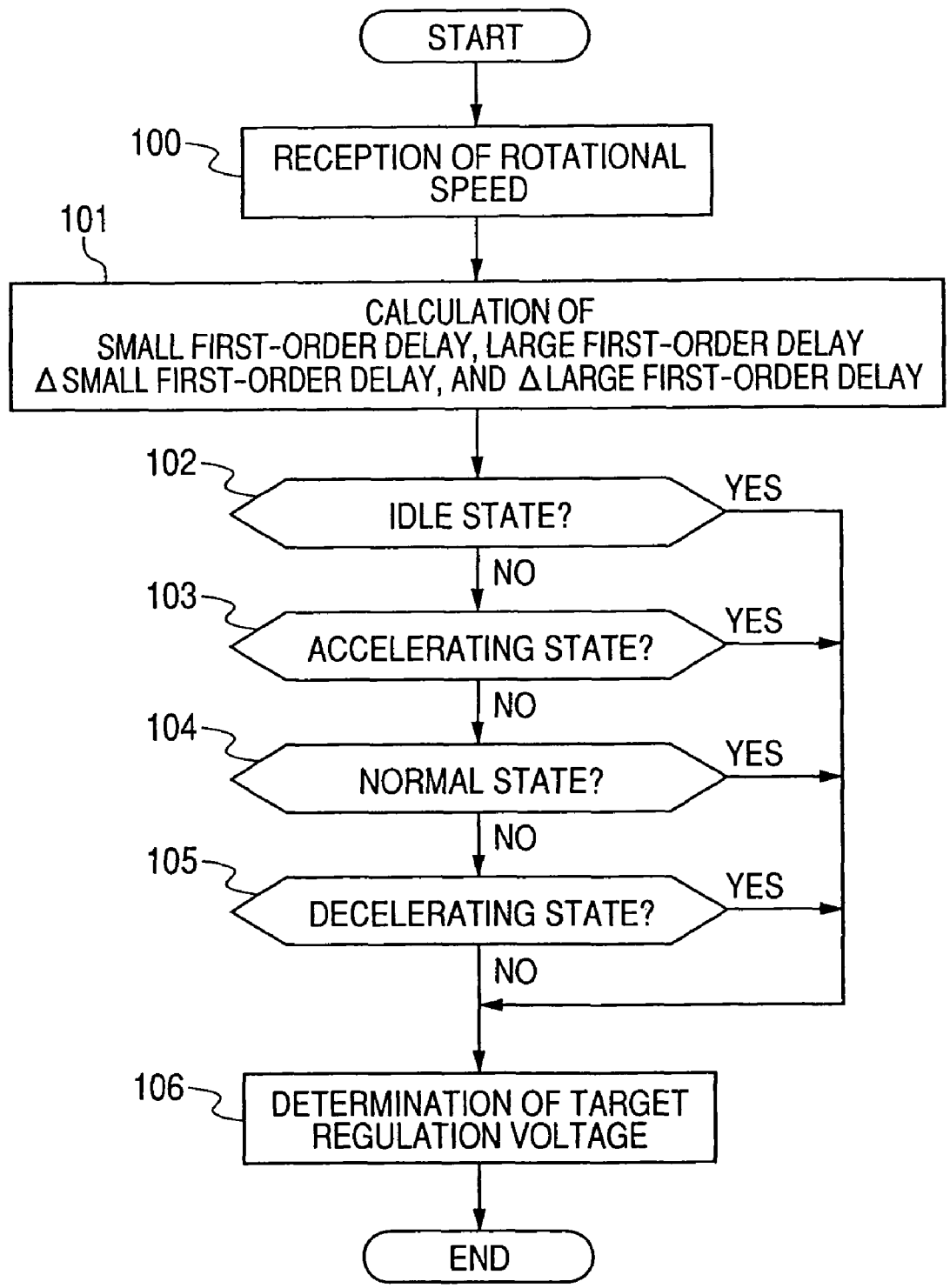
FIG. 4 is a flowchart showing the operation of the target regulation voltage setting apparatus.

FIG. 4 is a flowchart showing the operation of the target regulation voltage setting apparatus 8, which is performed at regular time intervals (every several milliseconds, for example).

This operation begins by receiving, through the communication controller 802, the data indicative of the rotational speed of the vehicle alternator 1 sent from the vehicle-use power generation control device 2 (step S100). The received data is inputted into the first-delay calculating circuit 901. At step S101, the first-order delay calculating circuit 901 calculated the large and small first-order delays on the basis of this data, and the running-state determining circuit 902 calculates variation for each of the calculated large and small first-order delays.

Subsequently, the running-state determining circuit 902 determines at step S102 whether the vehicle is in the idle state or not on the basis of the small first-order delay calculated by the first-order delay calculating circuit 901. FIG. 5 is a table used to determine the running state of the vehicle, and to set the target regulation voltage in accordance with the determined running state of the vehicle. The unit of the numeric values in "DETERMINING CRITERIA" of this table is rpm of the engine 6. For example, the running-state determining circuit 902 determines that the vehicle has entered the idle state if the small first-order delay changes from the range below 550 (rpm of the engine 6) to the range between 550 and 600. Since the vehicle alternator 1 is driven by the engine 6 through a pulley, the rpm of the vehicle alternator 1 multiplied by the pulley ratio may be used in the "DETERMINING CRITERIA" instead of the rpm of the vehicle engine 6. FIG. 6 is a diagram showing an example of variation with time of the small first-order delay, which satisfies the criteria to determine that the vehicle has entered the idle state. As an alternative, the running-state determining circuit 902 may determine that the vehicle has entered the idle state if the small first-order delay changes from any value to the range between 550 and 600.

Returning to FIG. 4, if the determination result at step S102 is affirmative, the operation proceeds to step S106 where the target regulation voltage determining circuit 903 sets the target regulation voltage at 12.5 V in accordance with the table shown in FIG. 5. To stabilize the idle speed of the engine 6, the target regulation voltage is set at the relatively low voltage of 12.5V.

If the determination result at step S102 is negative, the operation proceeds to step S104 where the running-state determining circuit 902 determines whether the vehicle is in the accelerating state or not on the basis of the variation of the large first-order delay (indicated by "delta large first-order delay" in the table of FIG. 5). As shown in this table, it is determined that the vehicle has entered the accelerating state when the large first-order delay changes from the range over 30 to the range between 5 and 30. FIG. 7A is a diagram showing an example of variation with time of the large first-order delay, which satisfies the criteria to determine that the vehicle has entered the accelerating state.

If the determination result at step S103 is affirmative, the operation proceeds to step S106 where the target regulation voltage determining circuit 903 sets the target regulation voltage at 13.5 V in accordance with the table shown in FIG. 5.

If the determination result at step S103 is negative, the operation proceeds to step S104 where the running-state determining circuit 902 determines whether the vehicle is in the normal state (constant-speed state excluding the idle state) on the basis of the variation of the small first-order delay. As shown in the table of FIG. 5, it is determined that the vehicle is in the normal state when the variation of the small first-order delay is between −30 and 30, or when the vehicle is not in any of the idle state, accelerating state and decelerating state.

If the determination result at step S104 is affirmative, the operation proceeds to step S106 where the target regulation voltage determining circuit 903 sets the target regulation voltage at 13.5 V in accordance with the table shown in FIG. 5.

If the determination result at step S104 is negative, the operation proceeds to step S105 where the running-state determining circuit 902 determines whether the vehicle is in the decelerating state or not on the basis of the variation of the large first-order delay. As shown in the table of FIG. 5, it is determined that the vehicle is in the decelerating state when the variation of the large first-order delay is between −30 and −10. FIG. 7B is a diagram showing an example of the variation with time of the large first-order delay, which satisfies the criteria to determine that the vehicle has entered the decelerating state.

If the determination result at step S105 is affirmative, the operation proceeds to step S106 where the target regulation voltage determining circuit 903 sets the target regulation voltage at 14.5 V in accordance with the table shown in FIG. 5.

If the running state of the vehicle is determined on the basis of the rotational speed of the vehicle alternator 1 and its first-order delay as is conventionally done, when a shift change is performed, there is a possibility to make an erroneous determination depending on the variation of the rotational speed of the vehicle alternator 1 caused by the shift change. To cope with this, in this embodiment, the target regulation voltage setting device 8 uses the large first-order delay to remove the effect of the variation of the rotational speed caused by a shift change, to thereby correctly determine whether the vehicle is in the accelerating or decelerating state. In the conventional ways, there is a problem that when the vehicle shifts from the accelerating or decelerating state to the normal state, the timing at which this shift is determined to have occurred is delayed compared to the actual timing of the shift. To cope with this, in this embodiment, the small first-order delay is used so that this determination on the shift can be made with less delay. Hence, according to this embodiment, since the running state of the vehicle can be accurately determined from the rotational speed of the vehicle alternator 1, the target regulation voltage can be determined with high precision, to thereby improve fuel consumption. Furthermore, according to this embodiment, since it is possible to increase the target regulation voltage to perform regenerative braking when the vehicle is in the decelerating state, and thereafter to lower the target regulation voltage to reduce the power generation torque when the vehicle shifts to the normal state, fuel consumption can be further improved.

In this embodiment, a determination whether the vehicle is in the decelerating state is made for the last time. This makes it possible to prevent erroneously determining that the vehicle has entered the decelerating state. The target regulation voltage setting device 8 is disposed near the battery 3 which is relatively distant from the vehicle alternator 1. Accordingly, since the target regulation voltage setting device 8 is less affected by heat or magnetism from the vehicle alternator 1, the accuracy of setting the target regulation voltage can be further increased.

In this embodiment, the rotational speed of the vehicle alternator 1 corresponding to the first-order delay is calculated in accordance with the foregoing equation (1). This makes it possible to reduce the process load, because the value of the first-order delay can be updated successively. If the value of M is set to $2^n$ (n being a natural number), the process load can be further reduced, because the arithmetical operation of 1/M can be a simple bit shift operation.

It should be noted that the large first-order delay is suitable to detect the accelerating or decelerating state of the vehicle, however, it is not necessarily suitable to detect a shift from the accelerating or decelerating state to the normal state, and also to detect a shift again to the accelerating or decelerating state shortly thereafter, because the value of the first-order delay does not promptly change following the shift from the accelerating or decelerating state to the normal state. For example, in the case where the vehicle shifts from the decelerating state to the normal state, and further to the accelerating state, if the normal state lasts only for a short period of time, a determination on the running state of the vehicle may be made before the first-order delay becomes a value in the range of the normal state, as a result of which the timing at which it is determined that the vehicle has shifted to the accelerating state is delayed. This problem can be solved by modifying the operation of the target regulation voltage setting device 8 shown in FIG. 4, as described below.

Figure 8:
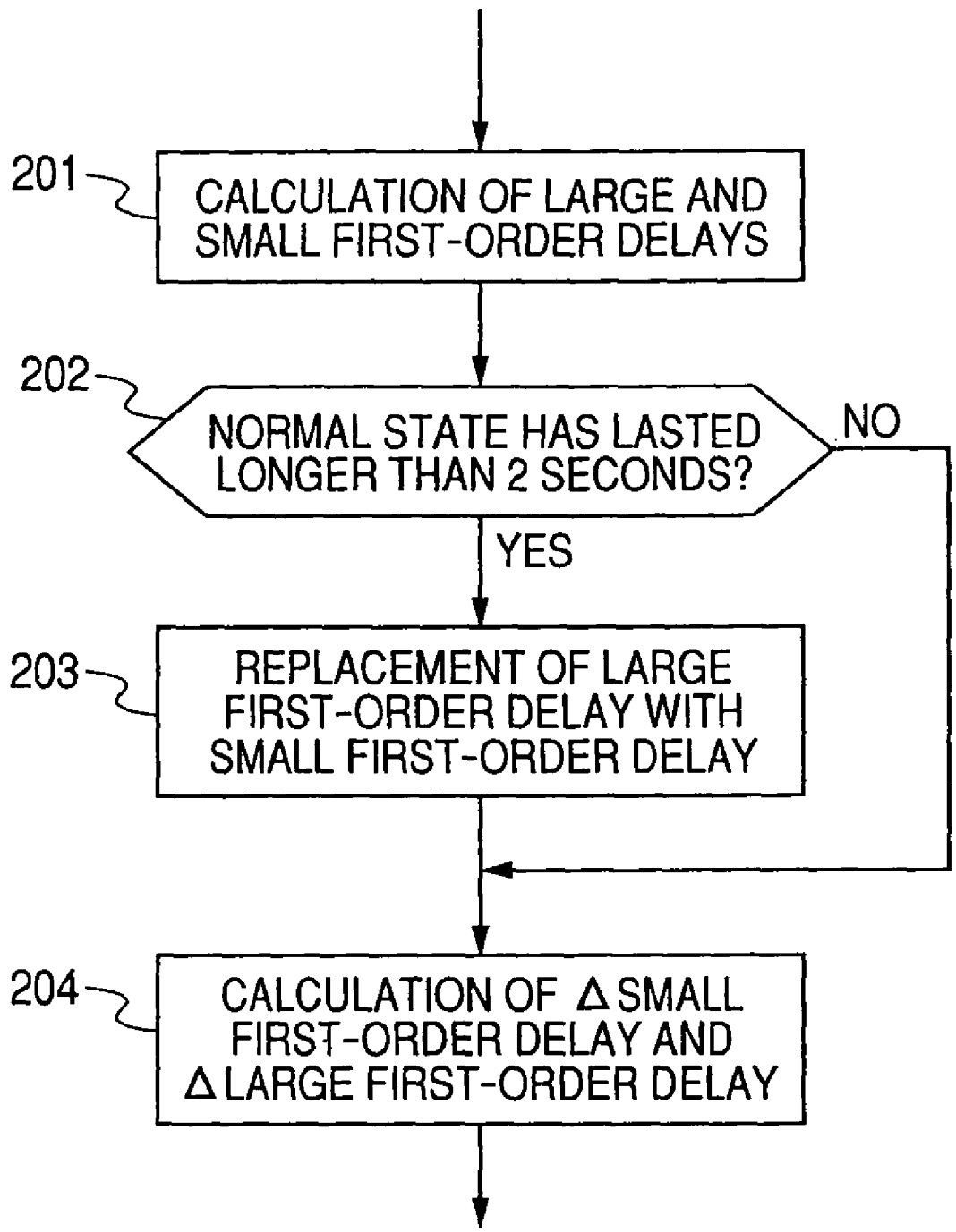
FIG. 8 is a partial flowchart by which part of the flowchart shown in FIG. 4 is replaced in a case where the target regulation voltage is adjusted in accordance with an integrated charge/discharge current of a battery.

FIG. 8 is a partial flowchart by which step S101 of the flowchart shown in FIG. 4 is replaced to solve the above problem. In this modification, when the data indicative of the rotational speed of the vehicle alternator 1 is received (step S100 in FIG. 4), the large and small first-order delays are calculated on the basis of this data at step S201. Subsequently, it is determined whether the normal state lasts longer than a predetermined time (2 seconds, for example) at step S202. This determination may be made on the basis of the determination result of the running state determining circuit 902. Alternatively, the running state determining circuit 902 itself may make this determination. If the determination result at step S202 is affirmative, the first-order delay calculating circuit 901 replaces the large first-order delay by the small first-order delay at step S203. Next, the running state determining circuit 902 calculates variations of each of the large and small first-order delays at step S204. Thereafter, step S102 and the succeeding steps are shown in FIG. 4 are performed.

As explained above, by replacing the large first-order delay by the small first-order delay when the normal state lasts longer than a predetermined time, it becomes easy to detect a shift from the normal state to the accelerating or decelerating state, to thereby reduce the delay of the timing at which the shift is determined to have occurred.

Although the target regulation voltage is variably set in accordance with the result of determination on the vehicle running state in the above embodiment, it is preferable to set the target regulation voltage in accordance with also the integrated value of the charge/discharge current indicating the remaining capacity of the battery 3 calculated by the integrated current value calculating circuit 904.

Figure 9:
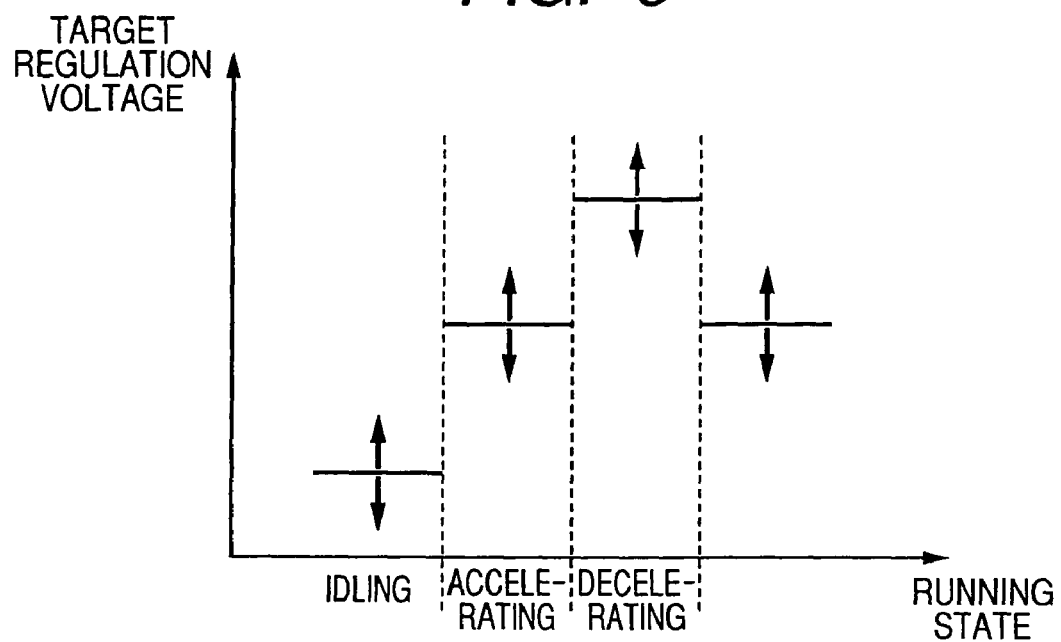
FIG. 9 is a diagram explaining an example to set the target regulation voltage in accordance with also the integrated charge/discharge current of the battery.
Figure 10:
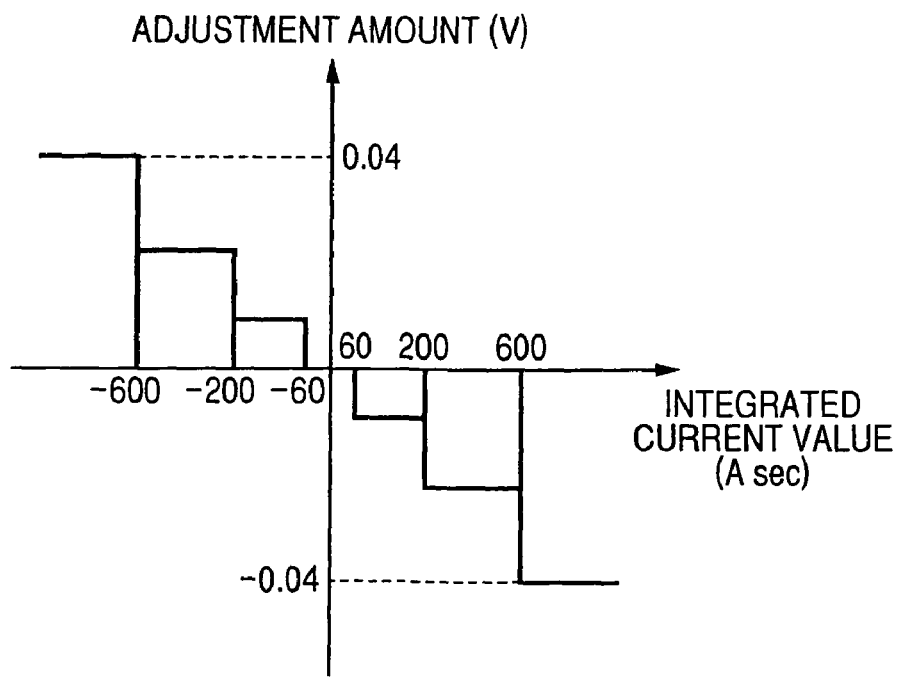
FIG. 10 is a diagram explaining an example to adjust the target regulation voltage in accordance with the integrated charge/discharge current of the battery.

FIG. 9 is a diagram explaining an example of setting the target regulation voltage in accordance with also the integrated value of the charge/discharge current. As shown in FIG. 9, the target regulation voltage set for each of the four kinds of the vehicle running states is lowered when the integrated value of the charge/discharge current is smaller than a predetermined value, while increased when it is larger than the predetermined value. FIG. 10 is a diagram explaining an example to adjust the target regulation voltage in accordance with the integrated value of the charge/discharge current as above.

FIG. 11 is a flowchart showing the operation of the target regulation voltage setting device 8 at the time of adjusting the target regulation voltage as above. This operation shown in FIG. 11 is different from the operation shown in FIG. 4 in that steps S301 and S302 are added before step S100, and step S303 is added after step S106. In the following, these added steps are explained.

Prior to receiving the data indicative of the rotational speed of the vehicle alternator 1 at step S100 (or concurrently with step S100, or after step S100), the current detecting circuit 803 detects the charge/discharge current of the battery 3 at step S301, and then the integrated current value calculating circuit 904 integrates the detected charge/discharge current at step S302.

After determining the target regulation voltage at step S106, the target regulation voltage determining circuit 903 makes, at step S303, the adjustment to the integrated value of the charge/discharge current calculated at step S302.

Adjusting the target regulation voltage in accordance with the integrated charge/discharge current of the battery 3 makes it possible to set the target regulation voltage to an optimum value in view of the remaining capacity of the battery 3, to thereby prevent overcharge or overdischarge of the battery 3.

The above explained preferred embodiments are exemplary of the invention of the present application which is described solely by the claims appended below. It should be understood that modifications of the preferred embodiments may be made as would occur to one of skill in the art.

What is claimed is:

1. A target regulation voltage setting apparatus for a vehicle on which a vehicle alternator is mounted comprising:
    a first function of calculating a large first-order delay and a small first-order delay of a rotational speed of the vehicle alternator at regular time intervals;

a second function of making a judgment on a running state of the vehicle by determining whether or not the vehicle is in one of an accelerating state and a decelerating state on the basis of a variation of the large first-order delay supplied from the first function, and determining whether or not the vehicle is in a normal state on the basis of a variation of the small first-order delay supplied from the first function; and a third function of determining a target regulation voltage of the vehicle alternator in accordance with a judgment result of the second function.

2. The target regulation voltage setting apparatus according to claim 1, wherein the first function replaces a value of the large first-order delay to be supplied to the second function by a value of the small first-order delay when the vehicle is determine to be in the normal state for a time period longer than a predetermined time period.

3. The target regulation voltage setting apparatus according to claim 1, wherein the second function determines whether or not the vehicle is in the decelerating state last in making the judgment.

4. The target regulation voltage setting apparatus according to claim 1, further comprising a fourth function of detecting a charge/discharge current of a battery charged by the vehicle alternator, and a fifth function of integrating the charge-discharge current detected by the fourth function, the third function determining the target regulation voltage in accordance with the judgment result of by the second function, and a value of the charge-discharge current integrated by the fifth function.

5. The target regulation voltage setting apparatus according to claim 4, wherein the target regulation voltage setting apparatus is disposed near the battery located at a distance from the vehicle alternator.

6. The target regulation voltage setting apparatus according to claim 1, wherein each of the large and small first-order delays is calculated by an expression of $((M-1)/M)\times$(previously calculated first-order delay)$+(1/M)\times$(currently detected rotational speed of the vehicle alternator), M being a smoothing factor which is set at a first value to calculate the large first-order delay, and to a second value smaller than the first value to calculate the small first-order delay.

7. The target regulation voltage setting apparatus according to claim 6, wherein each of the first and second values of the M is represented by $2^n$, n being a natural number.

* * * * *